Aug. 2, 1932.  A. D. BRUCE ET AL  1,870,036
THRUST BEARING FOR FLEXIBLE PIPE JOINTS
Filed Dec. 13, 1928   2 Sheets-Sheet 1
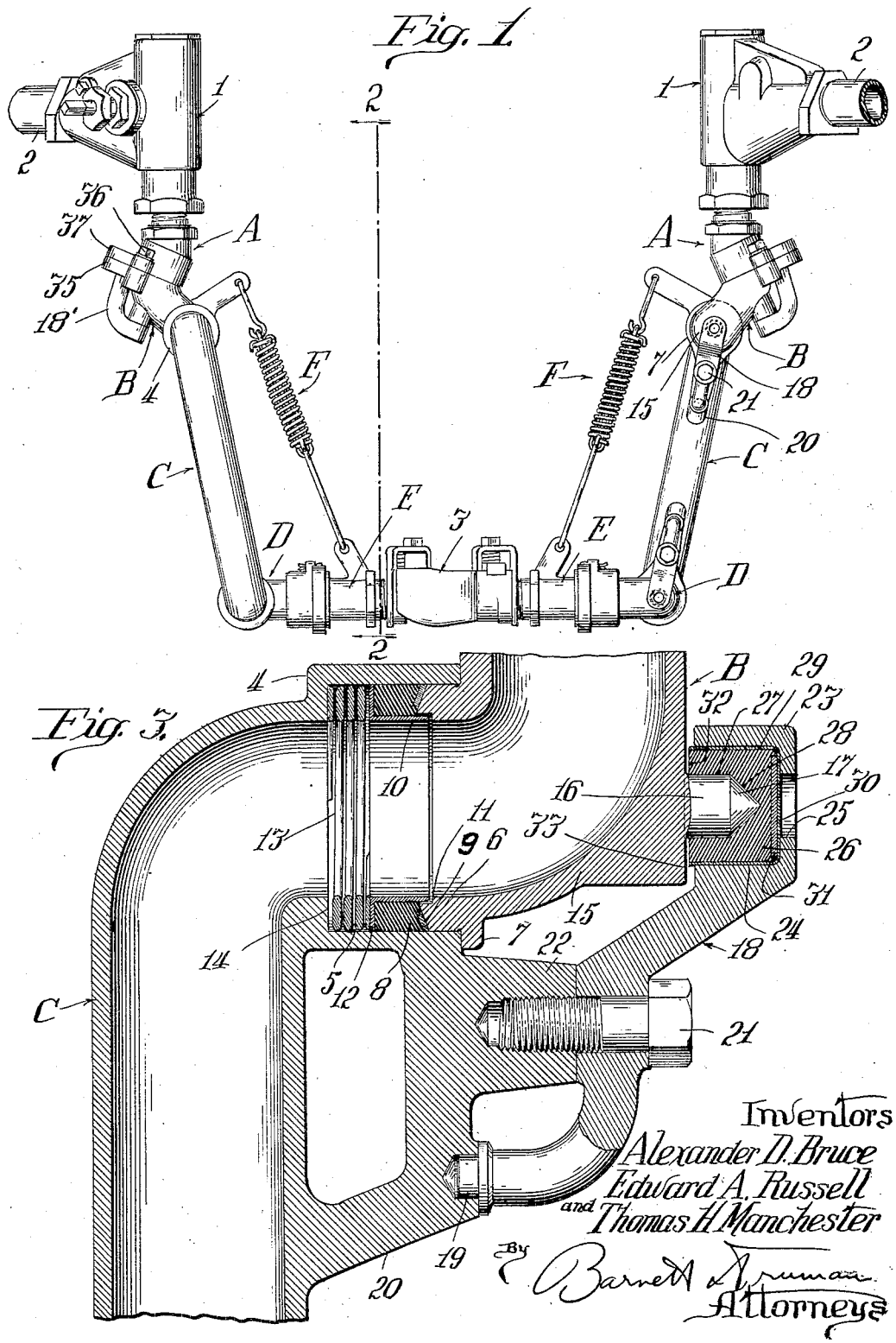

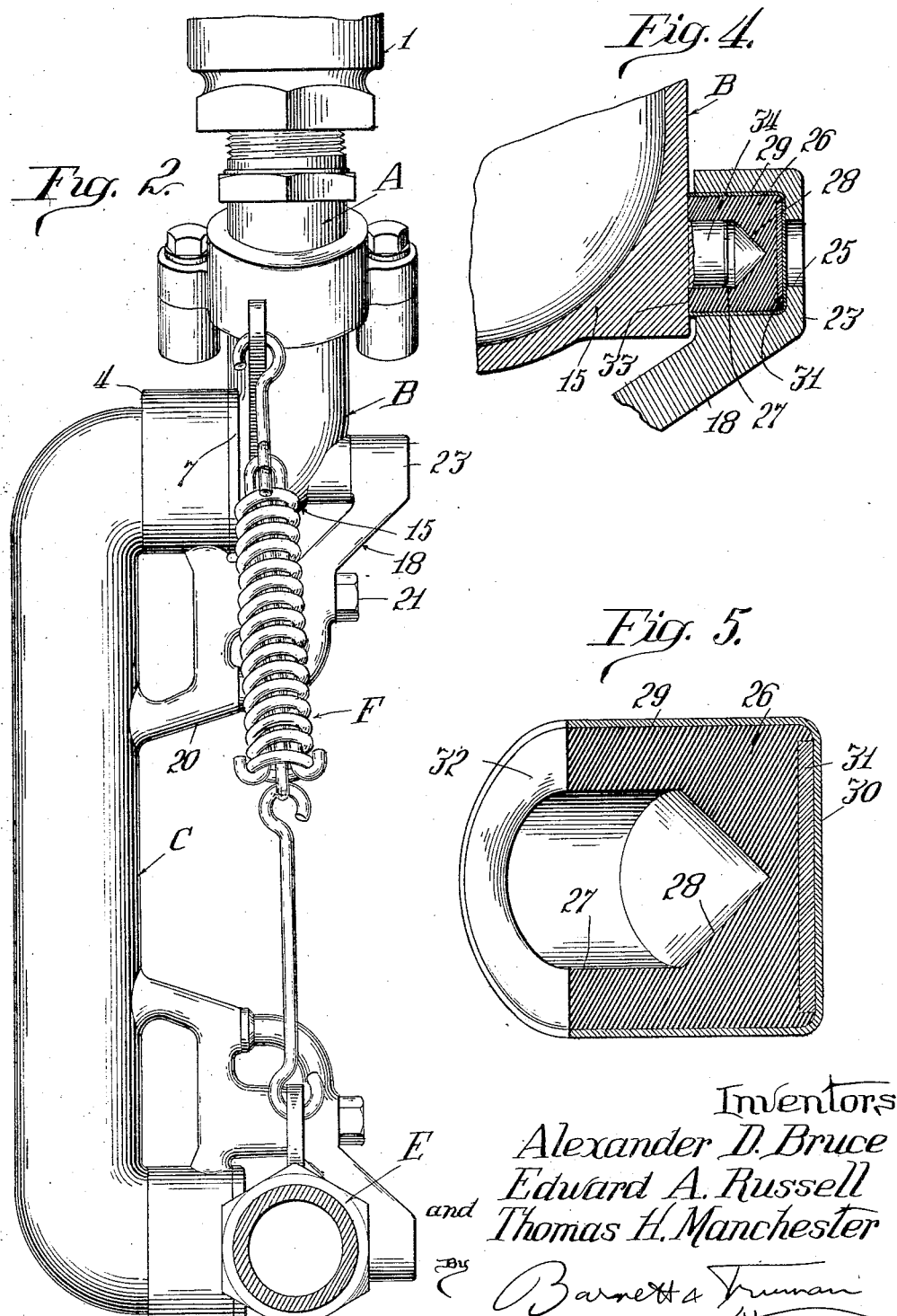

Patented Aug. 2, 1932

1,870,036

UNITED STATES PATENT OFFICE

ALEXANDER D. BRUCE, EDWARD A. RUSSELL, AND THOMAS H. MANCHESTER, OF CHICAGO, ILLINOIS, ASSIGNORS TO VAPOR CAR HEATING COMPANY, INC., OF CHICAGO, ILLINOIS, A CORPORATION OF NEW YORK

THRUST BEARING FOR FLEXIBLE PIPE JOINTS

Application filed December 13, 1928. Serial No. 325,876.

This invention relates to certain new and useful improvements in thrust bearings for flexible pipe joints, and more particularly to an improved form of thrust bearing and bushing therefor adapted for use in a metallic conduit structure consisting of a plurality of flexibly articulated sections.

The invention is here shown as applied to a flexible metallic conduit structure of the type disclosed in the copending application of Phillips, Serial No. 243,328, filed December 29, 1927. This flexible conduit comprises a plurality of metallic pipe sections, the end of one member being telescoped into the mating end of another member and journaled therein so that the sections are relatively rotatable about the axis of the pipe joint. Means is provided for sealing the joint between the members against the escape of steam or other fluid carried in the flexible conduit. At least one of the members is formed with an elbow bend adjacent the joint and a bearing stud projects from the elbow in line with the axis of the joint between the members. A bracket arm secured to and projecting from the other section is formed with a bearing seat for the stud, so that two longitudinally spaced bearings are provided between the two relatively rotatable sections. The bearing that supports the stud is also forced to accept the outward thrust of the fluid contained within the conduit which tends to separate the telescoped sections. The present invention relates particularly to an improved form of thrust bearing for use between the bracket arm and stud as hereinabove referred to.

One object of the invention is to provide a removable and renewable composition bushing in which the bearing stud is rotatably journaled, the bushing also accepting the end thrust of the stud.

Another object is to provide a bushing of the type described provided with a bearing socket having a conical inner end, the stud having a conical end portion adapted to seat in the recess and act as a thrust bearing against endwise movement of the stud.

Another object is to provide a bushing of this type adapted to alternatively accept the end thrust in the conical socket or on the outer end of the bushing which will then engage the conduit section at the base of the stud.

Another object is to provide an improved form of renewable thrust bearing bushing consisting of a suitable reinforced metallic casing and a filling of a self-lubricating bearing composition.

Another object is to provide an improved form of bracket arm and bearing stud in combination with a renewable composition bearing bushing, as hereinabove referred to.

Other objects and advantages of this invention will be more apparent from the following detailed description of one approved form of apparatus embodying the principles of this invention.

In the accompanying drawings:

Fig. 1 is a side elevation of one of the complete flexible conduit connections between the train pipes of two adjacent railway cars.

Fig. 2 is an end elevation, on a larger scale, of one of the flexible conduits, the view being taken substantially on the line 2—2 of Fig. 1.

Fig. 3 is a central longitudinal section, on a still larger scale, through one of the flexible joint assemblies between two adjacent sections of the conduit, the thrust bearing forming the particular subject-matter of this application being shown in operative position.

Fig. 4 is a fragmentary sectional view, corresponding to the right-hand portion of Fig. 3, illustrating the application of the improved bushing to a modified form of bearing stud.

Fig. 5 is a detail central sectional perspective through one of the bushings.

Referring to the drawings, at 1 is indicated the end train pipe valve which communicates with and is secured to the train pipe 2 on the car. The flexible conduit structure comprises a plurality of flexibly articulated metallic pipe sections A, B, C, D, and E, and a coupling member 3 is carried at the free end of the section E, the two couplings 3 on the conduit structures of adjacent cars being connected together when the cars are coupled in a train so that a continuous flexible conduit is formed which joins the train pipes 2 on the adjacent cars.

A yieldable supporting member indicated generally at F is utilized to support the lower members of the flexible conduit in substantially the normal position shown, when the cars and conduits are disconnected.

Each of the conduit sections A to E inclusive is connected with the adjacent section by a swiveled articulation consisting of interfitting cylindrical bearing elements held in operative relation without substantial endwise pressure of one member against the other, the joint between the bearing elements being sealed by a gasket which is in a sense floating and is maintained in its sealing position in part by a spring but more firmly and effectively by the pressure of the fluid passing through the conduit. Each of these swiveled connections is substantially the same, the one between sections B and C being illustrated in detail in Fig. 3. In this particular joint, each of the sections B and C is formed with an elbow bend adjacent the joint. The member or section C is formed with an enlarged head 4 at its end in which is a cylindrical socket 5 of greater outer diameter than the bore of the conduit structure. The end of the mating conduit structure B is formed with an annular nipple 6 adapted to fit snugly within the outer end portion of socket 5 and to swivel within this socket about the axis of the bore of the swiveled conduit members. An outer annular flange 7 limits the projection of nipple 6 into socket 5.

An annular gasket 8 formed of any suitable gasket composition is housed within the socket 2 and has an outer cylindrical surface adapted to fit snugly against the cylindrical wall of the socket. The outer end portion of gasket 8 is beveled inwardly, as indicated at 9, and the adjacent end of nipple 6 is correspondingly beveled so as to provide mating beveled surfaces on the gasket and nipple. A metallic ferrule 10 has a cylindrical flange portion fitting within the gasket 8 and extending beyond the beveled end thereof into a recess 11 in the end of the nipple 6. The ferrule also has an inner radial flange 12 fitting against the inner end of gasket 8. It will be noted that the inner diameter of the metallic ferrule is substantially the same as that of the bore of the conduit structures so that a substantially unbroken inner bore of constant diameter will be formed through the flexible conduit structure. A suitable expansion spring 13 is interposed between the radial flange 12 of the ferrule and the inner end 14 of socket 5 so as to force the gasket against the end of nipple 6. The engaging beveled surfaces of the gasket and nipple 10 urge the gasket outwardly and force the gasket into firmer relation with the outer wall of socket 5 so as to seal the joint at this point.

The spring 13 is primarily for the purpose of keeping the gasket or sealing means in place when the flexible structure is not under fluid pressure. When steam is passing through the conduit it will expand against the inner surface and the inner end of the gasket structure so as to force the gasket into firm sealing relation with the socket 5 and the end of nipple 6.

It will be noted that the fluid pressure within the conduit structure tends to force the end of section B out of the end of section C within which it is telescoped but the present invention relates to an improved form of bearing structure adapted not only to accept this outward thrust but to provide a second rotary bearing between the sections, spaced longitudinally of the axis of the joint from the bearing between nipple 6 and the socket in which it is journaled. On the outer surface of the elbow 15 of conduit section B is formed an outwardly projecting cylindrical stud or gudeon 16 positioned concentric with the axis of the swiveled joint between the conduit sections. In the preferred form of apparatus, the end of stud 16 is in the form of an outwardly projecting cone 17 the point of which terminates in the axis of rotation of the pipe joint.

A bracket arm 18 is mounted on the mating conduit section C and projects around the elbow 15 of section B so as to support the bearing for stud 16. In the form here shown, a stud 19 on one end of bracket arm 18 fits within a socket in the boss or enlargement 20 on section C, and the intermediate portion of the bracket arm is secured by a screw or bolt 21 to an outwardly projecting portion 22 of the boss 20. The outer end 23 of arm 18 is formed with a cylindrical socket 24 which is open on the inner end which faces the pipe joint, but is closed at its outer end except for a relatively small central opening 25.

The improved bushing consists of a cylindrical block 26 of suitable bearing composition, formed with a central cylindrical socket 27 open at the exposed end of the bearing block 26 and having a conical inner end 28. The stud 16 is adapted to be rotatably journaled in the cylindrical recess or socket 27 and the conical end 17 of the stud engages the inner conical end 28 of the socket to take up the end thrust. The bearing block 26 is enclosed in a metallic ferrule or thimble 29 which is open at its inner end and closed at its outer end 30. A steel reinforcing plate 31 is preferably positioned in the closed end of the ferrule to bridge the central opening 25 in the socket of the bracket arm 18. The purpose of providing the opening 25 is to facilitate the removal of the bushing assembly which fits snugly within the socket 24.

The bearing block 26 is preferably formed of a material known as "Noscorite", this being a composition of a phenolic condensation product and a natural clay having pronounced lubricating qualities. This composition material is very hard, but is self lubricating. This composition has maximum wear resisting qualities, while at the same time developing a minimum amount of friction when used in connection with the metallic bearing stud 16.

It will be noted in Fig. 3 that the inner end 32 of the bearing block 26 projects beyond the socket 24 in arm 18, but does not engage with the flat surface 33 of elbow 15 on section B, at the base of stud 16. Under normal conditions, when first installed, the outward thrust of the elbow 15 will be taken entirely by the conical point 17 of the stud bearing within the conical recess 28 in the bearing block 26. These mating surfaces wear very slowly, but if in time the wear is sufficient, the surface 33 of the section B will engage the outer end 32 of the bearing block so as to form an effective thrust bearing at this point.

Conduit structures of this general type have heretofore been made, wherein the elbow member 15 is provided with a cylindrical stud 34, not provided with the conical outer end 17 shown on the improved bearing stud 16. In such structures, the thrust has been taken entirely by the bearing surface 33 at the base of the stud engaging the outer end of the bushing mounted in bracket arm 18. As illustrated in Fig. 4, the improved thrust bearing bushing which forms the subject-matter of this invention can be used effectively in this older type of conduit structure. As there shown the conical inner end 28 of the bearing socket in block 26 is not utilized but the thrust is taken entirely upon the inwardly projecting exposed end 32 of the bushing. It will thus be apparent that this improved form of bushing may be used interchangeably either with the older form of conduit sections, or with the improved conduit sections provided with the new conical ended bearing stud 16.

While we have here shown and described in detail the joint between the conduit sections B and C, it is to be understood that the same articulating means, and the same form of thrust bearing bushing is used at the joints between sections A and B, and between sections C and D. The only difference is in the form of the bracket arm 18 and the manner in which this arm is anchored to one of the conduit sections. It will be noted that the bracket arm 18′ (at the upper portion of Fig. 1) is provided with an arcuate supporting base 35 secured by bolts 36 to a collar 37 on conduit section A. Otherwise the structure is substantially the same as in the flexible joint already described.

It will be noted that the improved form of bushing herein disclosed is not only alternatively adapted for use with different forms of flexible conduits, but when used in connection with the improved bearing stud 16, two successively utilized thrust surfaces are provided whereby the life of the bushing is greatly extended.

We claim:

1. In a thrust bearing for flexible pipe joints, a bushing comprising a cylindrical metallic ferrule closed at one end, a steel reinforcing plate in the closed end of the ferrule, and a block of bearing composition confined within the ferrule, the exposed end of the block being formed with a conical recess to receive a relatively rotating stud.

2. In a thrust bearing for flexible pipe joints, a bushing comprising a cylindrical metallic ferrule closed at one end, a steel reinforcing plate in the closed end of the ferrule, and a block of bearing composition confined within the ferrule, the exposed end of the block being formed with a cylindrical bearing socket having a conical inner end to receive a relatively rotating stud.

3. In a thrust bearing for flexible pipe joints, a bushing comprising a cylindrical metallic ferrule closed at one end, a steel reinforcing plate in the closed end of the ferrule, and a block of bearing composition confined within the ferrule, the composition consisting of a phenolic condensation product with a carrier of lubricating clay, the exposed end of the block being formed with a conical recess to receive a relatively rotating stud.

4. In a thrust bearing for flexible pipe joints, a bushing comprising a cylindrical metallic ferrule closed at one end, a steel reinforcing plate in the closed end of the ferrule, and a block of bearing composition confined within the ferrule, the composition consisting of a phenolic condensation product with a carrier of lubricating clay, the exposed end of the block being formed with a cylindrical bearing socket having a conical inner end to receive a relatively rotating stud.

ALEXANDER D. BRUCE.
EDWARD A. RUSSELL.
THOMAS H. MANCHESTER.